United States Patent
Scrbak et al.

(10) Patent No.: US 11,681,620 B2
(45) Date of Patent: Jun. 20, 2023

(54) USING ERROR CORRECTION CODE (ECC) BITS FOR RETAINING VICTIM CACHE LINES IN A CACHE BLOCK IN A CACHE MEMORY

(71) Applicant: Advanced Micro Devices, Inc., Santa Clara, CA (US)

(72) Inventors: Marko Scrbak, Austin, TX (US); Jagadish Kotra, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/384,420

(22) Filed: Jul. 23, 2021

(65) Prior Publication Data
US 2023/0022320 A1    Jan. 26, 2023

(51) Int. Cl.
*G06F 12/0808* (2016.01)
*G06F 11/10* (2006.01)

(52) U.S. Cl.
CPC ...... *G06F 12/0808* (2013.01); *G06F 11/1064* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 2008/0294935 A1* | 11/2008 | Ni | ............ | G06F 11/1068 711/E12.001 |
| 2012/0297256 A1* | 11/2012 | Plondke | ............ | G06F 12/0893 711/E12.001 |
| 2013/0007373 A1* | 1/2013 | Beckmann | ............ | G06F 12/126 711/E12.07 |
| 2014/0223106 A1* | 8/2014 | Shivashankaraiah | ............ | G06F 12/122 711/136 |
| 2014/0237193 A1* | 8/2014 | Shivashankaraiah | ............ | G06F 12/123 711/136 |
| 2018/0004597 A1* | 1/2018 | Kwon | ............ | G11C 29/024 |
| 2021/0248086 A1* | 8/2021 | Gupta | ............ | G06F 12/123 |

* cited by examiner

*Primary Examiner* — William E. Baughman
(74) *Attorney, Agent, or Firm* — Park, Vaughan, Fleming & Dowler LLP

(57) ABSTRACT

An electronic device includes a cache memory and a controller. The cache memory includes a set of cache blocks, each cache block having a number of locations usable for storing cache lines. The cache memory also includes a separate set of error correction code (ECC) bits for each of the locations. The controller stores a victim cache line, evicted from a first location in the cache block, in a second location in the cache block. The controller next stores victim reference information in a portion of the plurality of ECC bits for the first location, the victim reference information indicating that the victim cache line is stored in the second location.

20 Claims, 5 Drawing Sheets

USING ERROR CORRECTION CODE (ECC) BITS FOR RETAINING VICTIM CACHE LINES IN A CACHE BLOCK IN A CACHE MEMORY

BACKGROUND

Related Art

Some electronic devices include processors that perform computational and other operations along with memories that store data (i.e., inputs to and results from computational operations, instructions, control values, etc.) for use by the processors. Because retrieving data from memory is slow in comparison to the rate at which processors operate, many of these electronic devices also include cache memories. Cache memories are lower capacity, faster access memories from which copies of data can be retrieved quickly for use in processor operations. Although cache memories have typically been implemented using static random access memory (SRAM) circuitry, in some modern electronic devices, cache memories are implemented using dynamic random access memory (DRAM) circuitry. For example, some electronic devices use high-bandwidth memories implemented via stacks of DRAM circuitry memory dies as cache memories. DRAM cache memories are slower to access than SRAM cache memories, but are also cheaper, so higher capacity DRAM cache memories can be used as caches.

As DRAM cache memories of increasingly higher capacities are used in electronic devices, the storage of tags and other information used for identifying cache lines stored in the cache memories has become more of a problem. For example, using a separate SRAM memory as a tag array for storing tags has proven impractical due to the large number of tags to be stored for DRAM cache memories having multiple gigabytes of capacity. As another example, using the DRAM cache memories themselves for storing tag arrays is inefficient due to the need for relatively slow DRAM accesses to acquire tag information for cache line lookups. In the hope of avoiding these issues, designers have proposed configuring DRAM cache memories as directly associative and storing tags along with cache lines in cache blocks in DRAM cache memories. While direct associativity and co-storage of tags can enable faster accesses, directly associative caches can suffer from low hit rates, as cache lines from multiple memory addresses compete for individual locations in the cache memory.

BRIEF DESCRIPTION OF THE FIGURES

Throughout the figures and the description, like reference numerals refer to the same figure elements.

DETAILED DESCRIPTION

Figure 1:
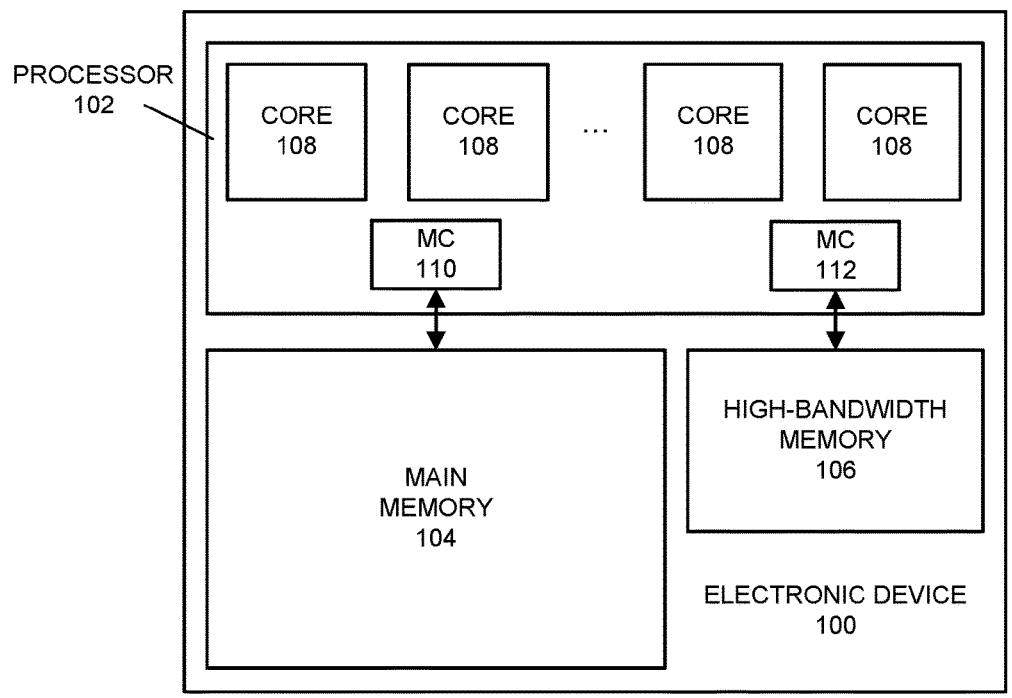
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Memory accesses: memory accesses, or, more simply, accesses, include interactions that can be performed for, on, using, and/or with data stored in memory. For example, accesses can include writes or stores of data to memory, reads of data in memory, invalidations or deletions of data in memory, moves of data in memory, writes or stores to metadata associated with data in memory, etc. In some cases, copies of data are accessed in a cache memory and accessing the copies of the data can include interactions that can be performed for, on, using, and/or with the copies of the data stored in the cache memory (such as those described above), along with cache memory-specific interactions such as updating coherence or access permission information, etc.

Overview

In the described embodiments, an electronic device includes a processor and a main memory in which data is stored for use in operations in the processor. The electronic device also includes a memory with dynamic random access memory (DRAM) circuitry that is used at least partially as a cache memory for storing cache lines with copies of data for faster access by the processor. The DRAM circuitry for the cache memory is organized into a plurality of rows, or cache blocks, each cache block including DRAM circuitry for K locations (where K=32, 64, or another number), each location being usable for storing an N-byte cache line (where N=48, 64, or another number), and a set of error correction code (ECC) bits for storing error correction information for a cache line stored in each location. In the described embodiments, a controller in the processor and/or in the memory repurposes/uses ECC bits that are not otherwise used for storing ECC information to assist with retaining evicted victim cache lines in cache blocks in the cache memory. In other words, instead of simply evicting victim cache lines, the victim cache lines are retained in the same cache blocks in the cache memory in new locations—and spare ECC bits are used for storing information for accessing retained victim cache lines in the new locations. Because the victim cache lines are retained in the cache, the hit rate for cache lines in the cache memory can increase. In addition, because the victim cache lines are retained in the same cache block (versus in other cache blocks in the cache memory), retained victim cache lines can be more rapidly retrieved using information from the repurposed ECC bits during accesses of the victim cache lines.

In some embodiments, for retaining a victim cache line, the controller first evicts the victim cache line from a first location in a cache block. For this operation, the controller determines that another cache line is to be stored in the first location and thus the victim cache line is to be overwritten in the first location. In order to retain the victim cache line in the cache memory, the controller stores the victim cache line in a second location in the same cache block. The second location is another N-byte portion of the cache block from among the K N-byte portions of the cache block that is selected by the controller to be used for storing the victim cache line. The controller also stores victim reference information in a portion of the ECC bits for the first location, the victim reference information indicating that the victim cache line is stored in the second location. For example, assuming that 32 ECC bits are available, but only 16 are used for error correction, the controller can store the victim reference information into the spare 16 bits of the ECC bits. As another example, assuming that 28 ECC bits are available, but error correction is not used (e.g., when parity information is sufficient for protecting cache lines and/or other forms of protection are used), the controller can store victim reference information into all 28 ECC bits. In some embodiments, the victim reference information includes a victim tag that identifies the victim cache line and a victim pointer that identifies the second location. In addition, the controller stores the other cache line in the first location and stores tag information and ECC information (if necessary) for the other cache line in other ECC bits for the first location.

In some embodiments, for accessing a victim cache line retained in a second location in a cache block, the controller reads the cache block from the DRAM circuitry into a DRAM row buffer as part of a lookup for the victim cache line in the first location. The controller checks tag information stored in the ECC bits for the first location to determine whether the victim cache line is stored in the first location. Because the victim cache line has been evicted to the second location, however, the tag information identifies the other cache line—and the lookup misses in the first location. The controller, however, also checks the victim tag in the victim reference information and determines that the victim cache line has been retained in the cache block based on the victim tag. The controller then uses the victim pointer from the victim reference information to find and access the victim cache line. Note that, because the cache block, which includes both the victim reference information and the victim cache line in the second location, was read into the DRAM row buffer, checking the victim reference information and accessing the victim cache line can be done rapidly via two reads of data already present in the DRAM row buffer.

In some embodiments, along with storing the victim reference information in the ECC bits for the first location, the controller stores origin information in ECC bits for the second location. The origin information includes a victim bit that identifies the victim cache line as having been evicted, an origin pointer that identifies the first location, and a victim tag that identifies the victim cache line. This involves repurposing/using ECC bits for the second location that are not otherwise used for storing error correction information for storing the origin information. In these embodiments, upon evicting the victim cache line from the second location (i.e., to use the second location for another cache line), the controller uses the origin information to identify and clear the victim reference information in the ECC bits for the first location. The controller also clears the origin information in the portion of the ECC bits for the second location and, if necessary, writes the victim cache line back to main memory.

In some embodiments, for selecting the second location in which the victim cache line is to be retained as described above, the controller uses one or more selection rules. For example, in some embodiments, the controller can randomly select from among all other locations in the cache block to find the second location. In some of these embodiments, the controller automatically uses the randomly selected location as the second location. In some of these embodiments, however, the controller performs one or more checks to ensure that the selected location should be used as the second location before doing so. For example, in some embodiments, the controller checks to ensure that the selected location is invalid/does not already store a cache line. As another example, in some embodiments, the controller checks usage data associated with the selected location to ensure that a cache block stored in the second location (if any) has not been accessed more recently than a threshold recency value. In some embodiments, the controller does not randomly select the location, but instead uses information about the locations in the cache block to select a given location. For example, the controller can use recency of access information, priority level information, invalidity information, etc. for selecting the location.

In some embodiments, before evicting the victim cache line from the first location, the controller checks that the victim cache line was not itself evicted from a third location. In other words, the controller checks to ensure that the victim cache line is not experiencing "chained eviction," which involves a given cache line being evicted from an original location and then one or more additional locations where the victim cache line was retained in the cache block. In these embodiments, if the victim cache line was evicted from a third location, the controller will not retain the victim cache line in the cache block as described above, but instead will evict the victim cache line from the cache block. In these embodiments, this is done to avoid the complexity of keeping track of victim cache lines in the cache block that experience chained eviction. In some embodiments, however, chained eviction is permitted to at least some extent (e.g., up to a threshold number of chained evictions for a given cache line). In these embodiments, the victim reference information and/or origin information for some or all of the locations where a given cache line has been stored can include information for identifying and finding victim cache lines that have experienced chained eviction. For example, in some embodiments, victim reference information in an original location where a given victim cache line was stored in a cache block is updated each time that the given victim cache line is evicted but retained in the cache block.

By retaining cache lines in the cache memory, the described embodiments can improve the hit rate of the cache memory. That is, useful cache lines can be more likely to remain available in the cache memory. This is in contrast to existing direct mapped systems in which useful cache lines, e.g., due to higher numbers of accesses in a given range of memory addresses, can be evicted from the cache memory. Also, by ensuring that victim cache lines remain in the same cache block, the described embodiments ensure that two separate memory reads (i.e., reads of information from two different cache blocks) are not necessary for accessing retained victim cache lines. In addition, by repurposing the ECC bits for storing victim reference information and origin information, the described embodiments store the records used for accessing retained victim cache lines in the cache block itself. Again, this ensures that two separate memory reads (i.e., reads of information from two different cache blocks) are not necessary for accessing victim cache lines. This stands in contrast to existing set associative cache memories in which multiple memory reads are required for accessing cache lines. Because the functioning of the cache memory improves, the processor can perform operations at a faster rate than processors in existing electronic devices. This can help to improve the overall operation of the electronic device, which increases user satisfaction with the electronic device.

Electronic Device

FIG. 1 presents a block diagram illustrating electronic device 100 in accordance with some embodiments. As can be seen in FIG. 1, electronic device 100 includes processor 102, main memory 104, and high-bandwidth memory 106. Processor 102, memory 104, and high-bandwidth memory 106 are all implemented in "hardware," i.e., using corresponding integrated circuitry, discrete circuitry, and/or devices. For example, in some embodiments, processor 102, memory 104, and high-bandwidth memory 106 are implemented in integrated circuitry on one or more semiconductor chips, are implemented in a combination of integrated circuitry on one or more semiconductor chips in combination with discrete circuitry and/or devices, or are implemented in discrete circuitry and/or devices.

Processor 102 is a functional block that performs computational, memory access, control, and/or other operations in electronic device 100. As can be seen in FIG. 1, processor 102 includes a number of cores 108. Each core 108 is a separate functional block that performs computational, memory access, control, and/or other operations. For example, in some embodiments, cores 108 are or include one or more central processing unit (CPU) cores, graphics processing unit (GPU) cores, embedded processors, application specific integrated circuits (ASICs), microcontrollers, and/or other functional blocks.

Main memory 104 is a functional block that stores data for other functional blocks in electronic device 100. For example, in some embodiments, main memory 104 is a higher capacity memory in electronic device 100 into which copies of data retrieved from a mass storage device (not shown) are initially stored for subsequent accesses by the other functional blocks. Memory 104 includes memory circuitry such as double data rate synchronous dynamic random-access memory (DDR SDRAM), and/or other types of memory circuits, as well as control circuits for handling accesses of the data stored in the memory circuits.

Figure 2:
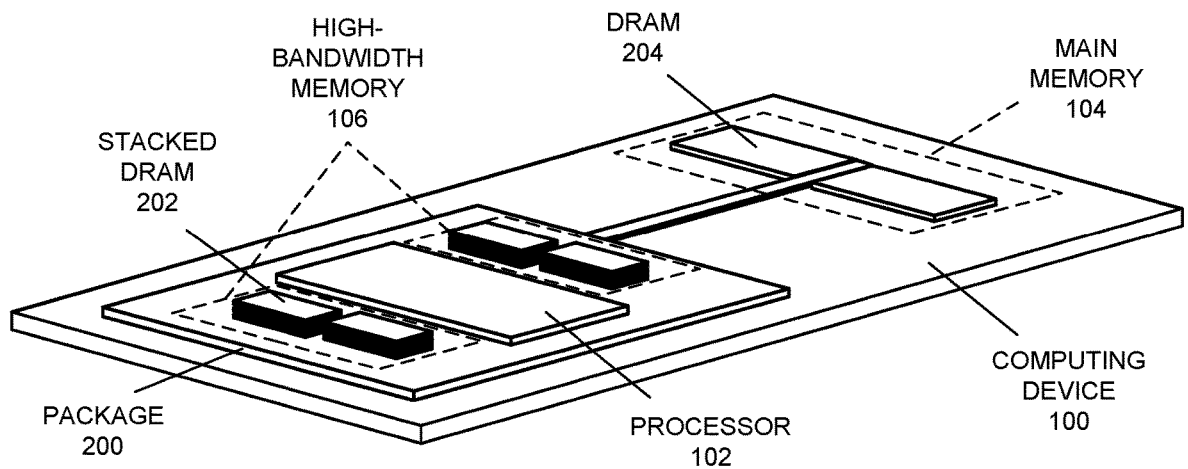
FIG. 2 presents a block diagram illustrating an isometric view of an electronic device in accordance with some embodiments.

High-bandwidth memory 106 is a functional block that stores data for other functional blocks in electronic device 100. High-bandwidth memory 106 includes memory circuitry such as DRAM (e.g., DDR SDRAM), and/or other types of memory circuits, as well as control circuits for handling accesses of the data stored in the memory circuits. In some embodiments, high-bandwidth memory 106 is or includes one or more stacks of DRAM chips (or "stacked DRAM") that are connected to processor 102 via high speed communication interfaces. FIG. 2 presents a block diagram illustrating an isometric view of an electronic device with a high-bandwidth memory in accordance with some embodiments. As can be seen in FIG. 2, electronic device 100 includes a package 200 on which a processor 102 (e.g., a processor integrated circuit chip) and four stacked DRAM modules are mounted or otherwise coupled (one of which is labeled stacked DRAM 202). Package 200 includes a chip package, an interposer, and/or another mounting or holding mechanism that may have communication routes (wires, guides, etc.) and/or circuitry via which processor 102 and the stacked DRAM modules communicate with one another and external devices. Electronic device 100 also includes, external to package 200, two DRAM modules (one of which is labeled DRAM 204). Each of the four stacked DRAM modules mounted on package 200 includes a number of DRAM integrated circuit chips (i.e., having DRAM memory circuits, etc. fabricated thereon) that are arranged in a stack and communicatively coupled to each other and/or processor 102 via through-silicon vias (TSVs), inductive and/or capacitive communication, etc. The DRAM modules external to package 200 each include one or more DRAM integrated circuit chips coupled via one or more signal routes (e.g., a bus, etc.) to processor 102. In some embodiments, due to the arrangement of the DRAM modules and the communication mechanisms therein, the stacked DRAM modules are significantly faster (e.g., one or more orders of magnitude faster) for processor 102 to access then the DRAM modules external to package 200.

Memory controllers (MC) 110-112 in processor 102 are functional blocks that perform operations for interfacing between processor 102 (and possibly other functional blocks in electronic device 100) and main memory 104 and high-bandwidth memory 106, respectively. Memory controllers 110-112 perform operations such as synchronizing memory accesses, detecting and avoiding conflicts between memory accesses, refreshing data stored in memory circuitry, directing data accessed during memory accesses to or from particular functional blocks in electronic device 100 (e.g., each of cores 108), etc.

In some embodiments, high-bandwidth memory 106, i.e., some or all of the memory circuitry in high-bandwidth memory 106, is used as a cache memory. In these embodiments, copies of data retrieved from main memory 104 (or other sources, such as lower level caches, a mass storage device, etc. (not shown)) are cached/stored in high-bandwidth memory 106 for rapid access by functional blocks in processor 102. For example, in some embodiments, the memory circuitry in high-bandwidth memory 106 is organized into a plurality of rows, some of which are used as cache blocks within the cache memory. Each cache block includes memory circuitry for K locations (where K=32, 64, or another number), each location being usable for storing an N-byte cache line (where N=64, 48, or another number), and a set of error correction code (ECC) bits for storing error correction information for a cache line stored in each location. In these embodiments, processor 102 (e.g., memory controller 112, cores 108, etc.) and/or high-bandwidth memory 106 perform operations for storing and accessing cache lines in locations in cache blocks in high-bandwidth memory 106, as well as other cache-memory related operations.

In some embodiments, among the operations performed by processor 102 (e.g., memory controller 112, cores 108, etc.) and/or high-bandwidth memory 106 for using memory circuitry in high-bandwidth memory 106 as a cache memory are operations for retaining victim cache lines in cache blocks in high-bandwidth memory 106. For example, these operations can include using information in ECC bits to keep track of retained victim cache lines. Operations for retaining victim cache lines are described in more detail below.

Returning to FIG. 1, although electronic device 100 is shown in FIG. 1 with a particular number and arrangement of functional blocks and devices, in some embodiments, electronic device 100 includes different numbers and/or arrangements of functional blocks and devices. For example, in some embodiments, electronic device 100 includes a different number of processors. Generally, in the described embodiments, electronic device 100 includes sufficient numbers and/or arrangements of functional blocks to perform the operations herein described.

Electronic device 100 as shown in FIG. 1 is simplified for illustrative purposes. In some embodiments, however, electronic device 100 includes additional or different elements and mechanisms for performing the operations herein described and other operations. For example, electronic device 100 can include mass storage devices and/or lower level cache memories, electrical power functional blocks or devices, human interface functional blocks or devices (e.g., displays, touch sensitive input elements, speakers, etc.), input-output functional blocks or devices, etc.

Electronic device 100 can be, or can be included in, any electronic device that performs computational operations. For example, electronic device 100 can be, or can be included in, desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof. In some embodiments, electronic device 100 is included on one or more semiconductor chips. For example, in some embodiments, electronic device 100 is entirely included in a single "system on a chip" (SOC) semiconductor chip, is included on one or more ASICs, etc.

Error Correction Code Bits in Cache Blocks

In the described embodiments, cache blocks in a cache memory include error correction code (ECC) bits. The ECC bits are a separate set of H bits associated with each location in the cache memory where a cache line can be stored (where H=32, 40, or another number). The ECC bits were originally included in the cache blocks for storing ECC information, which could be used by functional blocks for correcting bit faults or errors in cache lines stored in the cache blocks. For example, the ECC information could be used to correct a single bit error in a cache line and detect two bit errors. Because more efficient ECC correction schemes may be used for cache lines (e.g., simply detecting an error, but not correcting the error) or ECC may not be used, some or all of the ECC bits are not needed for storing ECC information. There are therefore surplus ECC bits available in each set of ECC bits. In the described embodiments, some or all of the surplus ECC bits are repurposed for storing information that is used for retaining victim cache lines in cache blocks. For example, assuming that there are 32 ECC bits in the set of ECC bits for each location but only 16 of the ECC bits are used for storing ECC information, there are up to 16 ECC bits that can be repurposed for storing information for retaining cache lines in cache blocks. As another example, assuming that 40 ECC bits are available, but error correction is not used (e.g., when parity information is sufficient for protecting cache lines and/or other forms of protection are used), up to 40 ECC bits can be repurposed for storing information for retaining cache lines in cache blocks.

Figure 3:
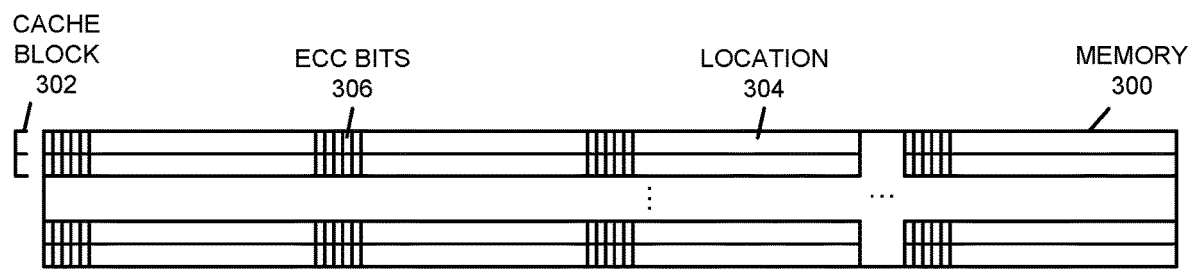
FIG. 3 presents a block diagram illustrating ECC bits in cache blocks in a memory in accordance with some embodiments.

FIG. 3 presents a block diagram illustrating ECC bits 306 in cache blocks 302 in a memory 300 in accordance with some embodiments. In some embodiments, memory circuitry in high-bandwidth memory 106 is partially or wholly arranged as shown in memory 300, although this is not a requirement. As can be seen in FIG. 3, memory 300 includes a number of cache blocks 302 (two of which are labeled in FIG. 3). Each cache block 302 includes Mbytes of storage (where M=8192, 16,384, or another number) in memory circuitry that is read at least in part in a single read operation. For example, in some embodiments, memory 300 is a high-bandwidth memory (e.g., high-bandwidth memory 106) implemented in DRAM circuitry with Mbyte cache blocks and all Mbytes in a cache block are read into a row buffer in a single read operation. In this way, once a cache block is read from the cache memory, the entire cache block or a given portion thereof is available for the operations for retaining victim cache lines described herein. The cache blocks 302 in memory 300 include a set of K locations 304 (where K=32, 64, or another number). Each location 304 includes a separate N-byte portion of the memory circuitry in the corresponding cache block 302 usable for storing cache lines (where N=64, 48, or another number).

Each cache block 302 additionally includes K separate sets of ECC bits 306. For example, in some embodiments, each set of ECC bits includes W bits (where W=32, 40, or another number). Each set of ECC bits 306 is associated with a respective location 304. As described above, the ECC bits were originally intended to store ECC information for correcting errors in data in the respective location 304, but more efficient ECC schemes and/or other data protection schemes have rendered some or all of the ECC bits 306 surplus. In the described embodiments, portions of the ECC bits are used for storing victim reference information and/or origin information for and/or associated with victim cache lines. Generally, "victim" cache lines are cache lines that have been evicted from locations 304 to make space for incoming cache lines. If the scheme described herein was not used, the victim cache lines would be evicted and thus overwritten in the cache block—and possibly also written back to a lower level cache or main memory (i.e., for modified data or other data that is to be written back). Instead, the victim cache lines are moved from original locations 304 to other locations 304 in cache blocks 302 in order to retain the victim cache lines in the cache blocks. Victim reference information that is used for finding the moved victim cache lines is included in ECC bits 306 for the original location 304 and origin information that is used for identifying the original location 304 for victim cache lines is included in ECC bits 306 for the other locations 304 to which cache lines are moved.

Figure 4:
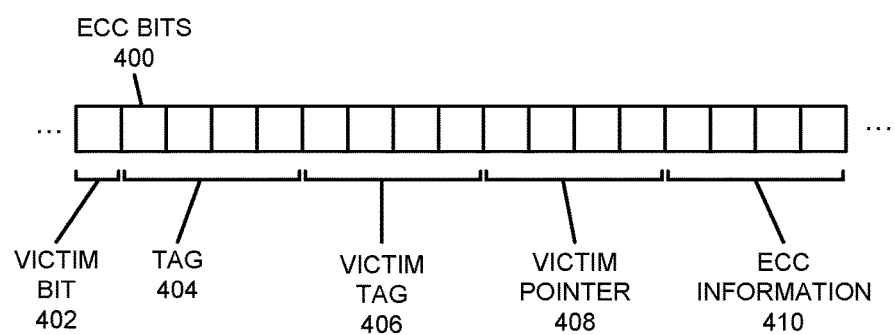
FIG. 4 presents a block diagram illustrating a set of ECC bits storing victim reference information in accordance with some embodiments.

FIG. 4 presents a block diagram illustrating a set of ECC bits 400 storing victim reference information in accordance with some embodiments. As can be seen in FIG. 4, the victim reference information includes victim bit 402, tag 404, victim tag 406, victim pointer 408, and ECC information 410. Victim bit 402 is or includes a bit that is left unset to indicate that the cache line stored in the associated location (e.g., location 304) was not previously moved into the location after being evicted—i.e., that the cache line stored in the associated location is not itself a victim cache line. When victim bit 402 is unset, therefore, it is assumed that victim reference information—or no information about a victim cache line—is stored in ECC bits 400

Tag 404 is or includes bits that are used for storing a tag of a cache line that is presently stored in the associated location. Tag 404 includes sufficient bits of a memory address for the cache line to determine, during a cache line lookup, whether a cache line stored in the associated location is the desired cache line to be accessed. For example, in some embodiments, the cache memory is direct mapped and the tag includes sufficient bits to identify a given cache line from among a set of cache lines that may be stored in the associated location.

Victim tag 406 is or includes bits that are used for storing a tag of a victim cache line was previously stored in the associated location, but that has been evicted and moved to another location in the cache block in order to retain the victim cache line in the cache block. Victim tag 404 includes sufficient bits of a memory address for the victim cache line to determine, during a cache line lookup, whether the victim cache line stored in the other location is the desired cache line to be accessed. For example, in some embodiments, the cache memory is direct mapped and the tag includes sufficient bits to identify the victim cache line from among a set of cache lines that may be stored in the associated location.

Victim pointer 408 is or includes bits that are used for storing a pointer to another location into which the victim cache line identified in victim tag 406 was moved upon being evicted from the associated location—and thus where the victim cache line should be presently stored. Victim pointer 408 includes sufficient bits to uniquely identify the other location from among all possible locations in the cache block to which the victim cache line could have been moved. For example, in some embodiments, victim pointer 408 stores an offset that represents a number of locations away from the associated location and/or another location in the cache block (e.g., a first location in the cache block) where a victim cache line is stored.

ECC information 410 is or includes bits that are used for storing ECC information for a cache line that is presently stored in the associated location. ECC information 410 includes information such as correction bits/patterns in accordance with an ECC scheme that is being used for error detection and/or correction for the cache line in the associated location.

Although a number of bits are shown in each of victim bit 402, tag 404, victim tag 406, victim pointer 408, and ECC information 410 in FIG. 4, in some embodiments, different numbers of bits are included in some or all of victim bit 402, tag 404, victim tag 406, victim pointer 408, and ECC information 410. Generally, victim bit 402, tag 404, victim tag 406, victim pointer 408, and ECC information 410 include sufficient bits to perform operations herein described (i.e., retention of victim cache lines in cache blocks, error correction/detection, etc.). In addition, for the example in FIG. 4, it is assumed that chained eviction is not permitted for victim cache lines. In some embodiments, chained eviction, in which a victim cache line has been evicted from two or more locations in a cache block, but is still retained in the cache block, is permitted. In some of these embodiments, ECC bits 400 include additional information used for identifying and finding victim cache lines that have experienced chained eviction. In some of these embodiments, however, the same information is included in ECC bits 400, but is updated each time that a given victim cache line is evicted.

Figure 5:
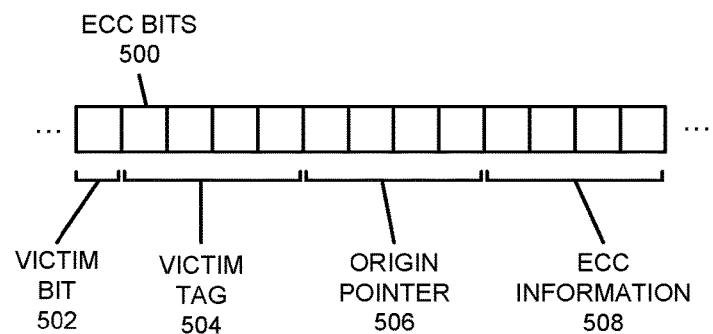
FIG. 5 presents a block diagram illustrating a set of ECC bits storing origin information in accordance with some embodiments.

FIG. 5 presents a block diagram illustrating a set of ECC bits 500 storing origin information in accordance with some embodiments. As can be seen in FIG. 5, the origin information includes victim bit 502, victim tag 504, origin pointer 506, and ECC information 508. Victim bit 502 is or includes a bit that is set to identify that the cache line stored in the associated location (e.g., location 304) as being a victim cache line that was previously moved into the location after being evicted from another location. When victim bit 502 is set, therefore, it is assumed that origin information is stored in ECC bits 500.

Victim tag 504 is or includes bits that are used for storing a tag of a victim cache line that is currently stored in the associated location. Victim tag 504 includes sufficient bits of a memory address for the victim cache line to determine, during a cache line lookup, whether the victim cache line stored in the associated location is a specified cache line. For example, in some embodiments, the cache memory is direct mapped and the tag includes sufficient bits to identify the victim cache line from among a set of cache lines that may be stored in the location from which the victim cache line was evicted.

Origin pointer 506 is or includes bits that are used for storing a pointer to a location from which the victim cache line identified in victim tag 504 was evicted. Origin pointer 506 includes sufficient bits to uniquely identify the other location from among all possible locations in the cache block from which the victim cache line could have been evicted. For example, in some embodiments, origin pointer 506 stores an offset that represents a number of locations away from the associated location and/or another location in the cache block (e.g., a first location in the cache block) from where a victim cache line was evicted.

ECC information 508 is or includes bits that are used for storing ECC information for a cache line that is presently stored in the associated location. ECC information 508 includes information such as correction bits/patterns in accordance with an ECC scheme that is being used for error detection and/or correction for the cache line in the associated location.

Although a number of bits are shown in each of victim bit 502, victim tag 504, origin pointer 506, and ECC information 508 in FIG. 5, in some embodiments, different numbers of bits are included in some or all of victim bit 502, victim tag 504, origin pointer 506, and ECC information 508. Generally, victim bit 502, victim tag 504, origin pointer 506, and ECC information 508 include sufficient bits to perform operations herein described (i.e., retention of victim cache lines in cache blocks, error correction/detection, etc.). In addition, for the example in FIG. 5, it is assumed that chained eviction is not permitted for victim cache lines. In some embodiments, chained eviction, in which a victim cache line has been evicted from two or more locations in a cache block, but is still retained in the cache block, is permitted. In some of these embodiments, ECC bits 500 can include additional information used for identifying and finding victim cache lines that have experienced chained eviction. In some of these embodiments, however, the same information is included in ECC bits 500, but is cleared and/or updated each time that a given victim cache line is evicted.

Process for Retaining Victim Cache Lines in Cache Blocks

Figure 6:
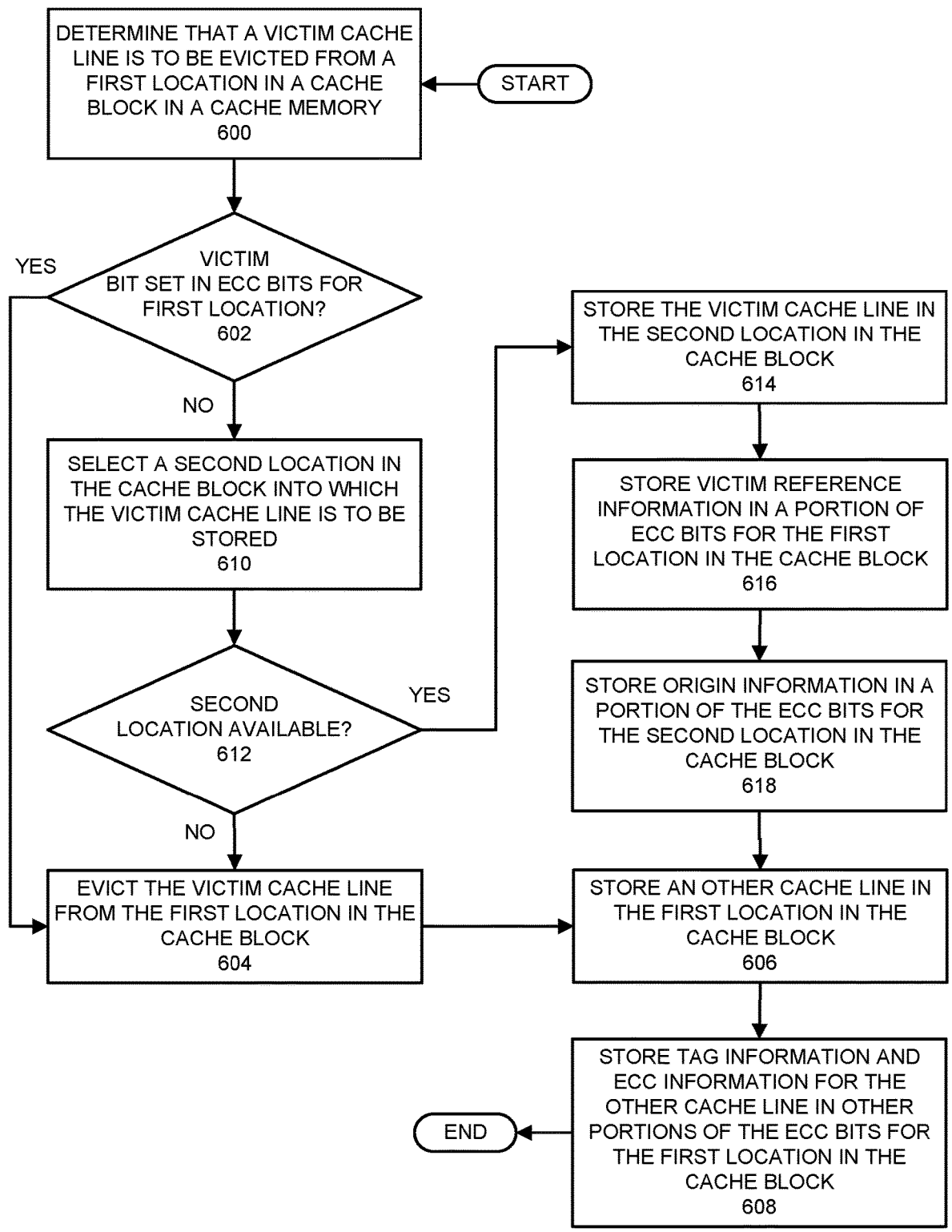
FIG. 6 presents a flowchart illustrating a process for retaining victim cache lines in a cache memory in accordance with some embodiments.
Figure 7:
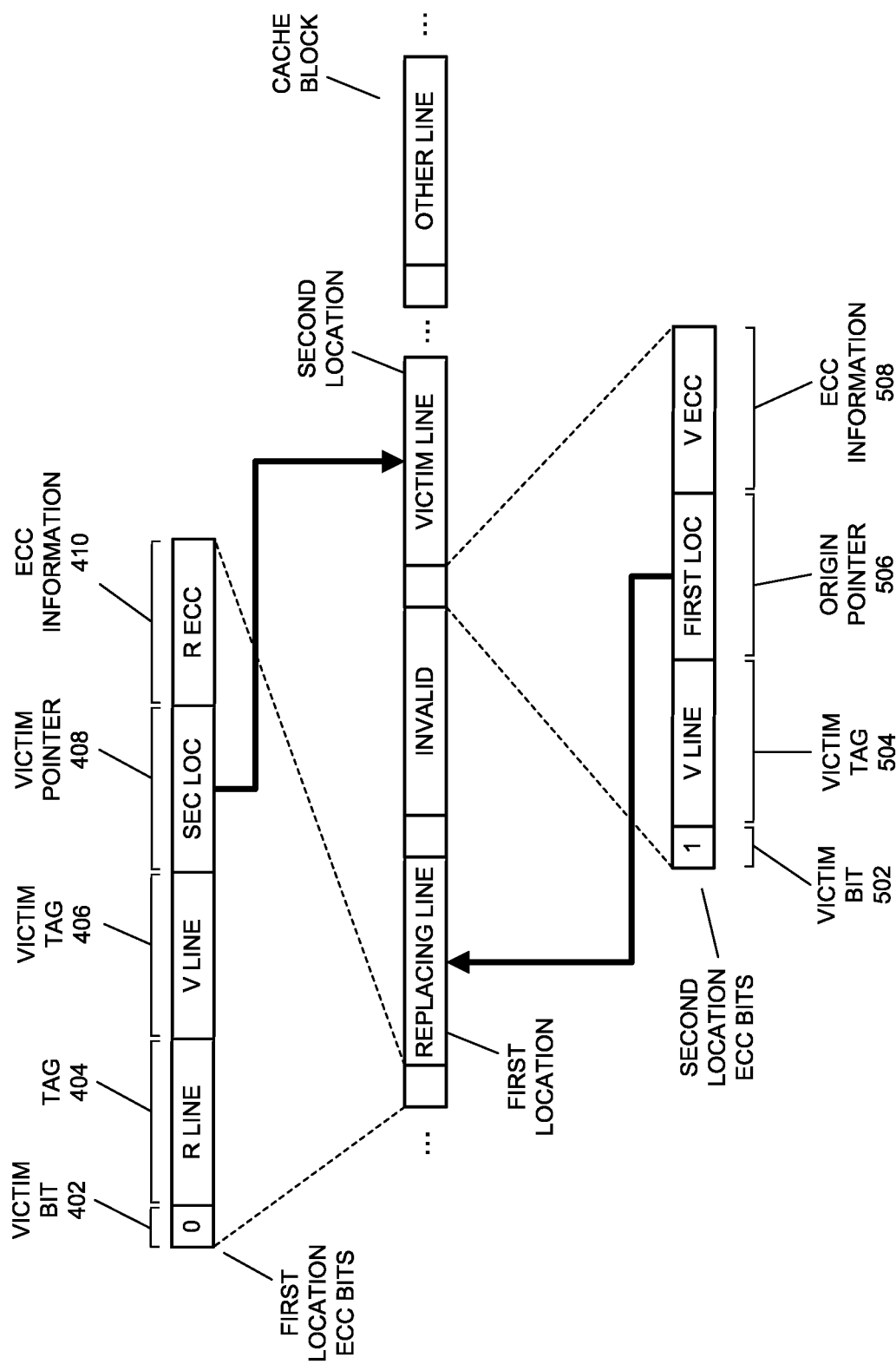
FIG. 7 presents a block diagram illustrating a victim cache line retained in a cache memory in accordance with some embodiments.

In the described embodiments, victim cache lines are retained in other locations in cache blocks in a cache memory after having been evicted from their original locations. FIG. 6 presents a flowchart illustrating a process for retaining victim cache lines in a cache memory in accordance with some embodiments. FIG. 6 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations. FIG. 7 presents a block diagram illustrating a victim cache line retained in a cache memory in accordance with some embodiments. In other words, FIG. 7 presents an example of a state of cache lines and information in a cache block after the operations in FIG. 6 have been performed. FIG. 7 is presented as a general example of cache lines present in a cache block and information present in ECC bits in accordance with some embodiments. In other embodiments, other arrangements of cache lines and/or information can be used.

For the process shown in FIG. 6, it is assumed that a cache memory is direct mapped. This means that cache lines from ranges of memory addresses are cached/stored in single respective locations in the cache memory. For example, the victim cache line in the example in FIG. 6 is assumed to be from a memory address that maps to a particular first location in a cache block in the cache memory (e.g., a location 304 in a cache block 302). The victim cache line will therefore initially be stored in the first location upon being stored in the cache memory—although the victim cache line can be subsequently moved to a different location in the cache block as part of an operation for retaining the victim cache line in the cache memory as described below. This stands in contrast to other forms of associativity, such as set associative, in which two or more locations in the cache memory are used for storing cache lines from respective ranges of memory addresses.

For the process shown in FIG. 6, it is assumed that chained evictions are not permitted. Generally, chained eviction involves a given victim cache line being evicted two or more times from locations in a cache block—so that the given victim cache line is evicted from an original location as well as one or more additional locations in the cache block where the given victim cache line was retained. Because chained eviction is not permitted, for the process shown in FIG. 6, a victim cache line that is experiencing chained eviction is evicted from a cache block—and thus is not retained in the cache block (as described for steps 602-604). In some embodiments, however, chained eviction is permitted. In these embodiments, the operations of FIG. 6 are adjusted to enable victim cache lines experiencing chained eviction to be retained in a cache block. In embodiments in which chained eviction is permitted, the victim reference information and origin information can include information for identifying and finding victim cache lines that have experienced chained eviction.

In FIG. 7, ECC bits for a first location and a second location are shown in an expanded view, as illustrated by the dashed lines. The ECC bits shown in FIG. 7 are presented as examples. In some embodiments, other arrangements and types of information are present in the ECC bits. Generally, the ECC bits for the first and second locations include sufficient information for performing the operations herein described. FIG. 7 also shows two pointers, one of which leads from victim pointer 408 to the second location and the other of which leads from origin pointer 506 to the first location. These pointers are merely illustrative. In operation, victim pointer 408 and origin pointer 506 would store bit values that are interpreted by a controller to indicate/identify the second location and the first location, respectively.

As can be seen in FIG. 6, the process starts when a controller (e.g., memory controller 112) determines that a victim cache line is to be evicted from a first location in a cache block in a cache memory (step 600). For this operation, the controller receives, e.g., from a core 108 or another functional block, a request to store another cache line in the cache memory. The other cache line is assumed to have been retrieved from memory at a memory address that maps to the first location and thus the other cache line is to be stored in the first location. Because the victim cache line is presently stored in the first location, however, the victim cache line will need to be evicted in order to store the other cache line in the first location. In the event that the victim cache line includes modified data, or is "dirty," eviction could mean writing the victim cache line back to a lower level cache and/or a main memory (e.g., main memory 104). When the victim cache line is unmodified, or "clean," however, such a write-back is not necessary—and the victim cache line may simply be overwritten in the first location.

The controller then determines whether a victim bit (e.g., victim bit 402) is set in ECC bits for the first location (step 602). For this operation, the controller checks the victim bit in victim reference information stored in a portion of the ECC bits for the first location to determine whether the victim cache line presently stored in the first location was previously moved to the first location from another location in the cache block. In other words, the controller determines whether the victim cache line was previously a victim cache line evicted from another location in the cache block. If the victim bit was to be set, the victim cache line could not again be moved within the cache block in order to avoid the recordkeeping necessary for tracking the victim cache line through two or more moves within the cache block. For the example in FIG. 6, as shown in FIG. 7, the victim bit 402 in the ECC bits for the first location is assumed to be unset/clear—and thus equal to zero. When the victim bit is set (step 602), the controller evicts the victim cache line from the first location in the cache block to a main memory (or to a lower level cache memory, should a lower level cache memory be present) (step 604). The controller then stores the other cache line in the first location in the cache block (step 606). The controller also stores tag information and ECC information for the other cache line in portions of the ECC bits for the first location in the cache block (step 608). Following the operations of steps 604-608, the other cache line would be stored in the first location (shown as REPLACING LINE in FIG. 7), and tag 404 and ECC information 410 would be set for the other cache line (shown as R LINE and R ECC, respectively, in FIG. 7). The victim cache line, however, would be gone from the cache block and victim tag 406 and victim pointer 408 would be clear/unset or invalid (not shown in FIG. 7). Note that, in this case, the victim cache line is not retained in the cache block.

Because the victim bit is unset/clear (step 602), the controller selects a second location in the cache block into which the victim cache line is to be stored (step 610). For this operation, the controller chooses a second location from among locations in the cache block (i.e., other than the first location) into which the victim cache line is to be stored. Generally, the controller selects an available location from among the locations in the cache block, although the precise meaning of "available" depends on a set of selection rules in accordance with which the second location is selected. For example, in some embodiments, the controller randomly selects a location and then uses the location as the second location. In these embodiments, other data present in the second location is evicted. As another example, in some embodiments, the controller randomly selects a location, but then uses one or more rules to determine whether the location can be used as the second location. For instance, it may be required that the selected location is invalid and therefore does not presently store a cache line. Alternatively, it may be allowed that the location presently stores a cache line (which will be evicted), but it may be required that the cache line has not been recently accessed and/or accessed more than a given number of times. As yet another example, in some embodiments, the controller or another functional block keeps access records for locations in the cache block and the controller uses these records to select a particular location as the second location—and therefore does not randomly select a location. For instance, the controller may use a record of recency of accesses for some or all of the locations in the cache block to select a location that has not been recently accessed.

In some embodiments, due to limitations related to the number of bits in the victim pointer (e.g., victim pointer 408), the locations in the cache block that are allowed to be selected as the second location are limited. For example, if the victim pointer was to be a two-bit value, only four locations can be uniquely identified by the victim pointer. In this case, the controller should select from among four locations in the cache block for the second location—e.g., from among the first four locations in the cache block, from among the four locations closest to the first location, etc.

When a second location is not available (step 612), the controller evicts the victim cache line from the first location in the cache block (step 604). For this operation, if the victim cache line is modified or otherwise is to be written back to a lower level cache or main memory, evicting the cache block involves writing the victim cache line back to the lower level cache or main memory. Otherwise, when the victim cache line does not need to be written back, "evicting" the victim cache line simply means allowing the victim cache line to be overwritten so that the victim cache line is no longer present in the cache block. The controller then stores the other cache line in the first location in the cache block (step 606). The controller also stores tag information and ECC information for the other cache line in portions of the ECC bits for the first location in the cache block (step 608). Following the operations of steps 604-608, the other cache line would be stored in the first location (shown as REPLACING LINE in FIG. 7), and tag 404 and ECC information 410 would be set for the other cache line (shown as R LINE and R ECC, respectively, in FIG. 7). The victim cache line, however, would be gone from the cache block and victim tag 406 and victim pointer 408 would be clear/unset or invalid (not shown in FIG. 7). As described above, in this case, the victim cache line is not retained in the cache block.

When the second location is available (step 612), the controller stores the victim cache line in the second location in the cache block (step 614). For this operation, the controller moves or copies the victim cache line from the first location to the second location in the cache block—i.e., moves or copies the bits of the victim cache line. This is shown in FIG. 7 as VICTIM LINE in the second location. The controller also stores victim reference information in a portion of the ECC bits for the first location in the cache block (step 616). For this operation, the controller stores, in the ECC bits for the first location, information usable for subsequently finding the moved victim cache line in the second location in the cache block (e.g., as described for FIG. 8). This operation includes storing both a victim tag 406 and a victim pointer 408—which together are considered the victim reference information—for the victim cache line in the ECC bits for the first location. This is shown in FIG. 7 as V LINE in victim tag 406 and second location (SEC LOC) in victim pointer 408. For this operation, victim bit 402 remains unset/cleared.

Along with storing victim reference information in the ECC bits for the first location, the controller stores origin information in a portion of the ECC bits for the second location (step 618). For this operation, the controller stores, in the ECC bits for the second location, information usable for subsequently finding the first location from which the victim cache line was evicted/moved (e.g., as described for FIG. 9). This operation includes storing both a victim tag 504 and an origin pointer 506—which together are considered the origin information—for the victim cache line in the ECC bits for the second location. This is shown in FIG. 7 as V LINE in victim tag 504 and first location (FIRST LOC) in origin pointer 506. For this operation, the controller also sets victim bit 402 to indicate that the second location presently stores a victim cache line that was evicted from another location.

The controller then stores the other cache line in the first location in the cache block (step 606). The controller also stores tag information and ECC information for the other cache line in portions of the ECC bits for the first location in the cache block (step 608). Following the operations of steps 606-608, the other cache line would be stored in the first location, which is shown as REPLACING LINE in FIG. 7. In addition, tag 404 and ECC information 410 are set for the other cache line, which are shown as R LINE and R ECC, respectively, in FIG. 7.

As shown in FIG. 7, locations other than the first location and the second location in the cache block can store cache lines or be empty or invalid. This is shown in FIG. 7 as OTHER LINE and INVALID in respective locations in the cache block. In some embodiments, the contents of locations in the cache block other than the first location and second location remain unchanged by the operations for retaining a victim cache line in the cache block.

Process for Accessing Retained Victim Cache Lines

Figure 8:
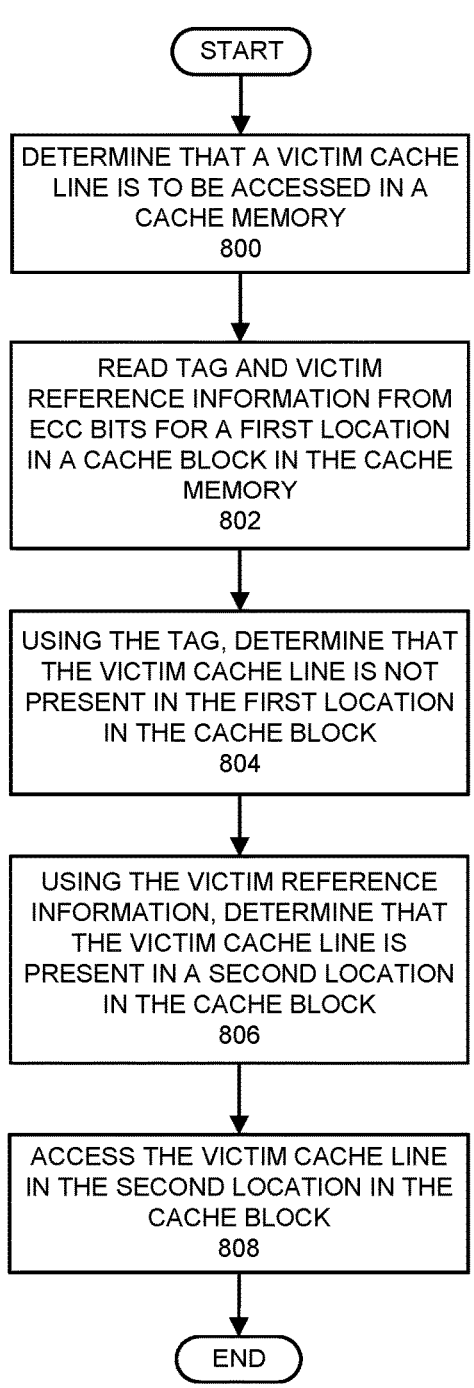
FIG. 8 presents a flowchart illustrating a process for accessing retained victim cache lines in a cache memory in accordance with some embodiments.

In the described embodiments, victim cache lines retained in locations cache blocks in a cache memory are accessed by other functional blocks in an electronic device (e.g., by a core 108, etc.). FIG. 8 presents a flowchart illustrating a process for accessing retained victim cache lines in a cache memory in accordance with some embodiments. FIG. 8 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations. In describing the operations of FIG. 8, the cache lines and information shown in FIG. 7 are referred to—and thus the operations of FIG. 6 are assumed to have previously been performed. As described above, FIG. 7 is presented as a general example of cache lines present in a cache block and information present in ECC bits in accordance with some embodiments. In other embodiments, other arrangements of cache lines and/or information can be used.

For the process shown in FIG. 8, it is assumed that chained evictions are not permitted. Generally, chained eviction involves a given victim cache line being evicted two or more times from locations in a cache block—so that the given victim cache line is evicted from an original location as well as one or more other locations in the cache block where the given victim cache line was retained. Because chained eviction is not permitted, for the process shown in FIG. 8, particular information in the ECC bits for a first location are read and used to access a victim cache line in a second location in a cache block. In some embodiments where chained eviction is permitted, different and/or additional information may be used for accessing a victim cache line retained in a cache block.

The process in FIG. 8 starts when a controller (e.g., memory controller 112) determines that a victim cache line is to be accessed in a cache memory (step 800). For this operation, the controller receives a request from another functional block (e.g., a core 108) to access the victim cache line. At this point, although the victim cache line is called "victim cache line" for clarity throughout the example in FIG. 8, the controller is not actually aware that the access will access a victim cache line. Instead, the controller simply receives an access request for a cache line that later turns out to be the victim cache line.

The controller then reads tag and victim reference information from ECC bits for a first location in a cache block in the cache memory (step 802). For this operation, based on an address for the victim cache line (and the fact that the cache memory is direct mapped), the controller reads the cache block from memory circuits in the memory for the cache into a row buffer in the memory (where the cache block is kept for subsequent operations of FIG. 8). The controller then acquires a tag, a victim tag, and a victim pointer (e.g., tag 404, victim tag 406, and victim pointer 408) from the row buffer.

Using the tag, the controller determines that the victim cache line is not present/stored in the first location in the cache block (step 804). For this operation, using typical lookup comparisons between a tag for the victim cache line and the tag from the ECC bits for the first location, the controller determines that the cache line presently stored in the first location is not the victim cache line. The controller therefore uses the victim reference information (or uses the victim reference information in parallel with checking the tag) to determine that the victim cache line is present in the second location in the cache block (step 806). Similarly to the comparison for the tag from the ECC bits for the first location, this involves using a typical lookup comparison between a tag for the victim cache line and the victim tag to determine that the victim cache line is presently stored in the second location.

The controller then uses the victim pointer from the victim reference information for accessing the victim cache line in the second location in the cache block (step 808). For this operation, the controller uses the victim pointer 408 to directly or indirectly identify the second location, from where the controller accesses the victim cache line. For example, in some embodiments, victim pointer 408 is an offset from a specified location in the cache block and the controller computes the second location accordingly.

Process for Evicting Victim Cache Lines

Figure 9:
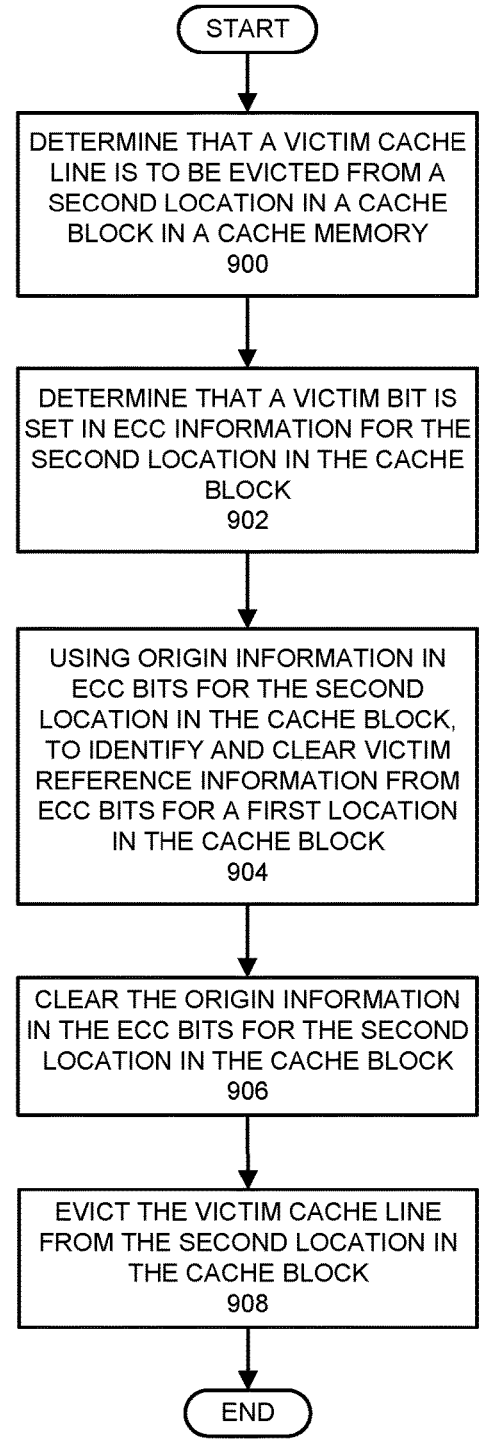
FIG. 9 presents a flowchart illustrating a process for evicting retained victim cache lines from a cache memory in accordance with some embodiments.

In the described embodiments, victim cache lines retained in locations cache blocks in a cache memory are evicted from the cache blocks in order to make space for incoming cache lines. FIG. 9 presents a flowchart illustrating a process for evicting retained victim cache lines from a cache memory in accordance with some embodiments. FIG. 9 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations. In describing the operations of FIG. 9, the cache lines and information shown in FIG. 7 are referred to—and thus the operations of FIG. 6 are assumed to have previously been performed. As described above, FIG. 7 is presented as a general example of cache lines present in a cache block and information present in ECC bits in accordance with some embodiments. In other embodiments, other arrangements of cache lines and/or information can be used.

For the process shown in FIG. 9, it is assumed that chained evictions are not permitted. Generally, chained eviction involves a given victim cache line being evicted two or more times from locations in a cache block—so that the given victim cache line is evicted from an original location as well as one or more other locations in the cache block where the given victim cache line was retained. Because chained eviction is not permitted, for the process shown in FIG. 9, a victim cache line that is experiencing chained eviction is evicted from a cache block—and thus is not retained in the cache block (as described for step 902). In some embodiments, however, chained eviction is permitted. In these embodiments, when a victim cache line is evicted from a location in a cache block, operations similar to those shown in FIG. 6 can be performed—albeit with victim reference information and origin information adjusted for a victim cache line that is experiencing chained eviction.

For the process shown in FIG. 9, it is assumed that the victim reference information is immediately cleared/removed from the ECC bits for the first location in the cache block (as described for step 904). In some embodiments, however, clearing the victim reference information can be "lazy" and thus delayed until a given event occurs. For example, in some of these embodiments, the victim reference information is not cleared until the victim reference information is next accessed—at which point the controller will realize that the victim reference information is invalid based on attempting to use the victim reference information.

The process in FIG. 9 starts when a controller (e.g., memory controller 112) determines that a victim cache line is to be evicted from a second location in cache block in a cache memory (step 900). For this operation, the controller receives a request from another functional block (e.g., a core 108) to store another cache line in the second location in the cache block. Based on the request, the controller determines that the victim cache line in the second location is to be evicted from the cache block. At this point, although the victim cache line is called "victim cache line" for clarity throughout the example in FIG. 9, the controller is not actually aware that a victim cache line will need to be evicted. Instead, the controller simply receives an access request for a cache line that will eventually lead to the eviction of the victim cache line.

The controller then determines that a victim bit is set in ECC information for the second location in the cache block (step 902). For this operation, based on an address for the other cache line (and the fact that the cache memory is direct mapped), the controller reads the cache block from memory circuits in the memory for the cache into a row buffer in the memory (where the cache block is kept for subsequent operations of FIG. 8). The controller then acquires the victim bit (e.g., victim bit 502) from the row buffer and determines that the victim bit is set.

Because the victim bit is set, the controller knows that a victim cache line has been retained in the second location in the cache block. In other words, the controller knows that the victim cache line presently stored in the second location was moved to the second location after having been evicted from a first location. The retained victim cache line cannot be again moved in the cache block—and therefore must be evicted from the cache memory. The controller therefore uses origin information in the ECC bits for the second location in the cache block to identify and clear victim reference information from ECC bits in a first location in the cache block (step 904). For this operation, the controller clears victim reference information in the ECC bits for the first location that was stored in the ECC bits for the first location in step 616 of FIG. 6. By clearing the victim reference information, the controller removes the reference to the victim cache line from the ECC bits for the first location—thereby removing the record that the victim cache line is present in the second location.

The controller then clears the origin information in the ECC bits for the second location in the cache block (step 906). For this operation, the controller clears origin information in the ECC bits for the second location that was stored in the ECC bits for the second location in step 618 of FIG. 6. By clearing the origin reference information, the controller removes the reference to the first location from the ECC bits for the first location—thereby removing the record that a victim cache line is present in the second location.

The controller then evicts the victim cache line from the second location in the cache block (step 908). For this operation, in some embodiments, the controller writes the victim cache line back to the main memory (or the lower level cache memory) in preparation for writing the other cache line to the second location in the cache block. For example, assuming that the victim cache line is modified, or dirty, and the modified data of the victim cache line has not yet been written back to the memory (and thus the copy in the second location is the only extant copy), the controller can write the victim cache line back to memory. On the other hand, if the victim cache line in the second location and the copy of the cache line in memory are identical, then "evicting" the victim cache line simply means allowing the victim cache line to be overwritten.

Although not shown in FIG. 9 for clarity and brevity, the controller then stores the other cache line in the second location. The controller also stores a tag and ECC information for the other cache line in ECC bits (if necessary) for the second location. These operations are similar to those described above for steps 606-608, although for the second location.

Chained Evictions

For the examples herein (e.g., those shown in FIGS. 4-9), it is assumed that chained eviction is not permitted. Generally, chained eviction involves a given victim cache line being evicted two or more times from locations in a cache block—so that the given victim cache line is evicted from an original location as well as one or more other locations in the cache block where the given victim cache line was retained. In some embodiments, however, chained eviction is permitted. In these embodiments, some or all of the operations for retaining victim cache lines in cache blocks and/or identifying and accessing victim cache lines retained in cache blocks are adjusted to account for the fact that a victim cache line may be evicted multiple times when experiencing chained eviction. For example, in some embodiments in which chained eviction is permitted, each time that a given victim cache line is evicted from an other location, victim reference information associated with the original location is updated to reflect a new other location in the cache block where the given victim cache line is stored. In these embodiments, origin information is kept in the new other location in which the given victim cache line is stored, but is cleared from other locations from where the given victim cache line was evicted. As another example, in some embodiments, a chain or sequence of victim reference information is kept, with victim reference information in the original location indicating a first other location to where a given victim cache line was moved and the victim reference information in each other location indicating the next other location where the given victim cache line was moved. In these embodiments, some or all of the other locations where the given victim cache line was/is stored include origin information that identifies the original location and/or a previous other location from where the given cache line was moved.

In some embodiments, at least one electronic device (e.g., electronic device 100, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDRS DRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A cache memory, comprising:
a plurality of cache blocks, each cache block including a plurality of locations usable for storing cache lines and a plurality of error correction code (ECC) bits for each location; and
a controller configured to:
store a victim cache line, evicted from a first location in the cache block, in a second location in the cache block; and
store victim reference information in a portion of a plurality of ECC bits for the first location, the victim reference information indicating that the victim cache line is stored in the second location.

2. The cache memory of claim 1, wherein the controller is further configured to:
perform a lookup for the victim cache line in the cache memory, the lookup including acquiring the victim reference information from the portion of the plurality of ECC bits for the first location; and
using the victim reference information, access the victim cache line in the second location.

3. The cache memory of claim 1, wherein the controller is further configured to:
store origin information in a portion of a plurality of ECC bits for the second location, the origin information including:
a victim bit that identifies the victim cache line as having been evicted;
an origin pointer that identifies the first location; and
a tag that identifies the victim cache line.

4. The cache memory of claim 3, wherein the controller is further configured to, when evicting the victim cache line from the second location in the cache block;
using the origin information, clear the victim reference information in the portion of the plurality of ECC bits for the first location; and
clear the origin information in the portion of the plurality of ECC bits for the second location.

5. The cache memory of claim 1, wherein victim reference information includes:
a tag that identifies the victim cache line; and
a victim pointer that identifies the second location.

6. The cache memory of claim 5, wherein the victim pointer includes an offset from a specified location in the cache block to the second location.

7. The cache memory of claim 1, wherein the controller is further configured to:
store an other cache line in the first location; and
store a tag that identifies the other cache line and any ECC information for the other cache line into respective other portions of the plurality of ECC bits for the first location, the other portions being different than the portion of the plurality of ECC bits for the first location.

8. The cache memory of claim 1, wherein the controller is configured to:
select the second location, the second location being selected:
from among all of the plurality of locations;
from among locations in the plurality of locations based on prior accesses of cache lines currently stored in the plurality of locations; or
from among locations in the plurality of locations that do not presently store cache lines.

9. The cache memory of claim 1, wherein the controller is configured to:
before evicting the victim cache line from the first location, check a victim bit in the plurality of ECC bits for the first location to determine whether the victim cache line was stored in the first location after having been previously evicted from a third location in the cache block; and when the victim bit is set, evict the victim cache line from the cache block without retaining the victim cache line in the cache block.

10. The cache memory of claim 1, wherein the cache memory is fabricated using dynamic random access (DRAM) memory circuitry and the cache block includes a row of the DRAM memory circuitry.

11. A method for retaining victim cache lines in a cache memory that includes a plurality of cache blocks, each cache block including a plurality of locations usable for storing cache lines and a plurality of error correction code (ECC) bits for each location, the method comprising:
storing a victim cache line, evicted from a first location in the cache block, in a second location in the cache block; and
storing victim reference information in a portion of a plurality of ECC bits for the first location, the victim reference information indicating that the victim cache line is stored in the second location.

12. The method of claim 11, further comprising:
performing a lookup for the victim cache line in the cache memory, the lookup including acquiring the victim reference information from the portion of the plurality of ECC bits for the first location; and
using the victim reference information, accessing the victim cache line in the second location.

13. The method of claim 11, further comprising:
storing origin information in a portion of a plurality of ECC bits for the second location, the origin information including:
a victim bit that identifies the victim cache line as having been evicted;
an origin pointer that identifies the first location; and
a tag that identifies the victim cache line.

14. The method of claim 13, further comprising, when evicting the victim cache line from the second location in the cache block:
using the origin information, clearing the victim reference information in the portion of the plurality of ECC bits for the first location; and
clearing the origin information in the portion of the plurality of ECC bits for the second location.

15. The method of claim 11, wherein victim reference information includes:
a tag that identifies the victim cache line; and
a victim pointer that identifies the second location.

16. The method of claim 15, wherein the victim pointer includes an offset from a specified location in the cache block to the second location.

17. The method of claim 11, further comprising:
storing an other cache line in the first location; and
storing a tag that identifies the other cache line and any ECC information for the other cache line into respective other portions of the plurality of ECC bits for the first location, the other portions being different than the portion of the plurality of ECC bits for the first location.

18. The method of claim 11, further comprising:
selecting the second location, the second location being selected:
from among all of the plurality of locations;
from among locations in the plurality of locations based on prior accesses of cache lines currently stored in the plurality of locations; or
from among locations in the plurality of locations that do not presently store cache lines.

19. The method of claim 11, further comprising:
before evicting the victim cache line from the first location, checking a victim bit in the plurality of ECC bits for the first location to determine whether the victim cache line was stored in the first location after having been previously evicted from a third location in the cache block; and
when the victim bit is set, evicting the victim cache line from the cache block without retaining the victim cache line in the cache block.

20. The method of claim 11, wherein the cache memory is fabricated using dynamic random access (DRAM) memory circuitry and the cache block includes a row of the DRAM memory circuitry.

\* \* \* \* \*